United States Patent [19]

Stevenson

[11] Patent Number: 4,865,633

[45] Date of Patent: Sep. 12, 1989

[54] SEPARATOR

[75] Inventor: William L. Stevenson, Roseville, Minn.

[73] Assignee: Crown Iron Works Company, Minneapolis, Minn.

[21] Appl. No.: 195,397

[22] Filed: May 12, 1988

Related U.S. Application Data

[63] Continuation of Ser. No. 74,566, Jul. 17, 1987, abandoned.

[51] Int. Cl.[4] .............................................. B01D 17/38

[52] U.S. Cl. ..................................... 55/235; 55/257.4; 55/257.5; 55/393; 55/434; 55/459.1

[58] Field of Search ..................... 210/512.1; 209/144, 209/211; 55/90, 346, 235, 257.1, 257.4, 257.5, 393, 434, 459.1, 459.4, 459.5

[56] References Cited

U.S. PATENT DOCUMENTS

| | | | |
|---|---|---|---|
| 3,989,485 | 11/1976 | Kilian | 55/90 |
| 4,263,027 | 4/1981 | Varnas et al. | 55/346 |

*Primary Examiner*—Frank Sever

*Attorney, Agent, or Firm*—Lawrence M. Nawrocki

[57] ABSTRACT

A baffle (34) configurable in a cyclone separator (10) in order to improve the flow capacity, efficiency, and effectiveness of the separator (10). The baffle (34) is disposed for vertical insertion through an upper wall (18) of the separation chamber (12) of the separator (10) to effect variable occlusion of an annular space (38) defined between a cylindrical wall (14) of the separation chamber (12) and a vortex finder (26) positioned generally centrally within the separation chamber (12). The baffle (34) functions to decrease pressure drop between an inlet (16) to the separator (10) and an outlet (32) from the separator (10).

6 Claims, 1 Drawing Sheet

SEPARATOR

This application is a continuation of application Ser. No. 74,566, filed July 17, 1987, now abandoned.

TECHNICAL FIELD

The present invention deals broadly with the field of equipments known as separators. Such equipments are employed for segregating a solid in a particulate configuration or a fluid from another solid particulate or fluid. The present invention, more specifically is directed to a separator known as a "cyclone" which is used to separate a particulate solid from a gaseous fluid in which it is entrained in order to purify the gas. The invention focuses upon features wherein the flow capacity, efficiency, and effectiveness of such a separator are increased.

BACKGROUND OF THE INVENTION

Various types of separators are known in the prior art. For example, a weir separator can be utilized to remove a fluid from another fluid having a greater density. Such a type of separator can, additionally, be employed for removing a solid, having a density lower than that of the liquid with which it is mixed, from the liquid.

Such a separator is only illustrative of many types that are currently available. As previously indicated, numerous configurations can be achieved, and the type of separator selected will depend upon the mixture components to be segregated.

The present invention specifically deals with a separator known as a "cyclone" separator. Such separators typically have a generally cylindrical separation chamber which is disposed above a collection chamber. The collection chamber tends to be conical with its wall tapering, concurrently, downwardly and inwardly with respect to the axis of the cone. The cone is typically truncated at the bottom, and means are provided at the truncation for conveying particulate matter separated from a gas introduced into the separation chamber away from the collection chamber.

The gas is accelerated to an intended velocity in some manner and tangentially injected into the separation chamber through an inlet thereto. The inlet, typically, extends in height from an upper edge of the separation chamber, downwardly along a side, generally circular cylindrical wall of that chamber.

One of two types of inlets are usually employed, although a third type is encountered on occasion. The first, known as an inside tangent inlet, is one wherein the full width of fluid flow through the inlet merges immediately with centrifugal flow occurring within the separation chamber as tangential insertion is effected. The second, known as an outside tangent inlet, is one wherein the width of fluid flow through the inlet is gradually merged with the centrifugal flow within the chamber. That is, the inlet extends, for example, through about 180° about the separation chamber, an outer wall of the inlet tapering inwardly toward the generally circularly cylindrical wall of the separation chamber. The third type is a hybrid of the first two types and has some of the features and performance characteristics of both inside tangent and outside tangent inlets.

While in the first type significant turbulence is created because of the full merging of the fluid entering in through the inlet, less turbulence is created in cyclones of the second type. It should be understood, however, that, even in the second type of cyclone, turbulence is created as the gas, entraining particulate matter therein, is merged into the separation chamber.

Generally centrally disposed within the cylindrical wall defining the separation chamber is what, in the industry, is referred to as a vortex finder. The vortex finder is, in effect, an egress conduit for fluid from which particulate matter has been separated. The gaseous fluid passing through the vortex finder is, in turn, recovered and stored in an appropriate container.

In operation, air passes through the inlet, regardless of what type of inlet is employed, and into the separation chamber. Movement of the air through the inlet is accomplished in any appropriate manner employing acceleration means external to the cyclone. That is, the fluid entraining the particulate matter can be driven into the separation chamber from the inlet end or drawn into the chamber through the inlet by employment of, for example, vacuum generation means downstream of the egress conduit. In either case of flow generation, however, it will be understood that a cyclone employs no moving parts.

Once the fluid flow enters through the inlet, it will pass circumferentially through an annular space between the vortex finder and the cylindrical wall of the separation chamber. The particulate matter entrained within the gas, being greater in density than the gas in which it is entrained, will be urged radially outwardly against the cylindrical side wall of the separation chamber. The gas in which the matter was entrained will tend to rotate about the vortex finder radially more inward.

As additional gas to be purged of the particulate matter flows into the separation chamber, accumulation of gas will tend to fill the annular base between the vortex finder and the cylindrical wall of the chamber. Eventually, the build-up will be sufficient so that the gas will enter the vortex finder and be vented. This effect is furthered by the fact that, the gas being radially inwardly from the cylindrical side wall of the chamber, it will rotate at a greater velocity and will tend to spiral over into the vortex finder.

The particulate matter, having been centrifugally impelled radially outwardly, continues to rotate along the inner surface of the cylindrical side wall of the separation chamber. As such matter builds up as additional fluid passes through the separator, increased friction created by engagement of the matter with the inner surface of the wall will cause the particles to slow down in their rotation and, commensurately, settle downwardly.

As previously discussed, a collection chamber, typically conical in shape, is disposed beneath the separation chamber. Particulate matter passing downwardly within the separation chamber will, therefore, enter the collection chamber and be funneled to a discharge for removal.

Performance of cyclone separators is measured in terms of minimization of pressure drop and collection efficiency. The former factor bears upon power requirements for generation of flow through the separator, and the longevity of equipments employed for generating flow. The latter factor is measured by the percentage of particulate matter actually moved from the fluid. High removal percentages are inhibited by the fact that, if there is significant turbulence in the circumferential flow, more matter will tend to remain radially inwardly rather than being impelled centrifugally outward. Additionally, if good flow patterns are not facilitated, a column of particulate matter may rise upwardly through the vortex finder from a location at the bottom of the collection chamber where it might have briefly accumulated.

Similarly, turbulence has a bearing upon minimization of pressure drop. It is axiomatic that, the greater the turbulence, the greater will be the pressure drop.

It is to these considerations dictated by the prior art that the present invention is directed. It is an apparatus which reduces pressure drop significantly in a cyclone separator and which maximizes particulate matter collection.

SUMMARY OF THE INVENTION

The present invention is an apparatus for employment in a particulate matter separator which includes a centrifugal separation chamber defined by a generally cylindrical side wall and an upper wall, a particulate matter collection chamber disposed at the bottom axial end of the separation chamber, an inlet, spaced axially upperward from the collection chamber, (a gas flow being able to be introduced tangentially into the separation chamber through the inlet), and a gas egress conduit which extends axially from the upper wall of the separation chamber centrally and downwardly into the separation chamber. An annular space is, thereby, defined between the egress conduit and the cylindrical wall of the separation chamber. The apparatus includes a baffle which extends downwardly from the upper wall of the separation chamber into the annular space. The baffle extends sufficiently far down so that it is at least partially radially coextensive with the gas flow inlet.

In a preferred embodiment, the baffle defines a plane in which the axis of the separation chamber cylindrical side wall lies. It is envisioned that the baffle would be provided with a radial dimension wherein it extends completely across the generally annular space between the gas egress conduit and the cylindrical side wall of the separation chamber.

Placement of the baffle angularly with the annular space can be such as to maximize its effect. It has been found that effect of the baffle has been optimized when the baffle is placed at an angular location in the circumferential flow just prior to a point at which the circumferentially passing flow would merge with newly introduced flow. Performance of the baffle to accomplish its intended goals, it has been found, however, is good even when the baffle is placed at as much as 90° upflow of that location, and acceptable even when the baffle is placed at as much as 180° upflow of that location.

The desirable effect of the baffle is also a function of the degree to which it extends downwardly (that is, the degree to which it is made radially coextensive with the gas flow inlet). The baffle can, in a preferred embodiment, therefore, be made adjustable in an axial direction so that desired characteristics can be maximized.

The present invention is thus an improved structure for minimizing pressure drop through a cyclone separator and for maximizing collection efficiency. More specific features and advantages obtained in view of those features will become apparent with reference to the DETAILED DESCRIPTION OF THE INVENTION, the appended claims, and the accompanying drawing figures.

DETAILED DESCRIPTION OF THE INVENTION

Figure 1:
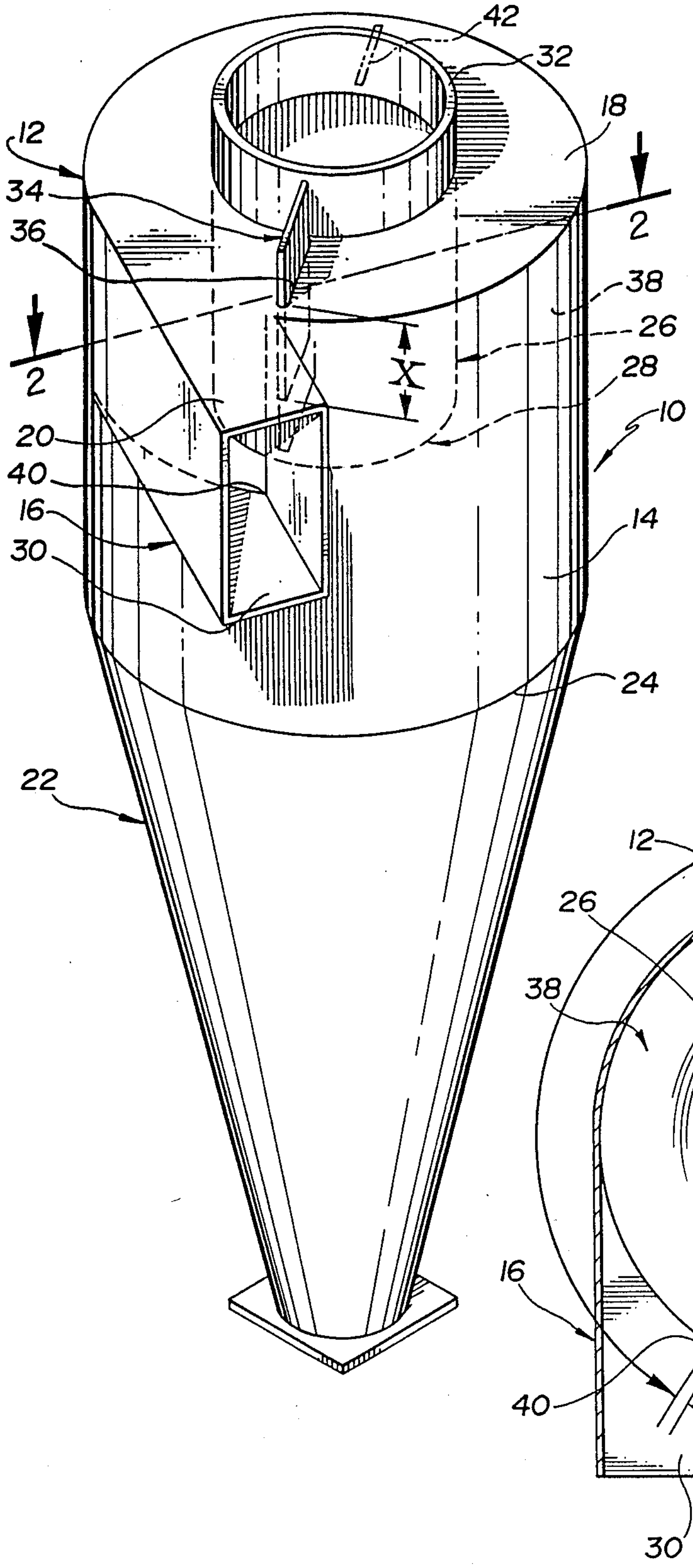
FIG. 1 is a perspective view of an embodiment of a cyclone separator employing the present invention, phantom lines being employed to show some parts and to illustrate alternative positions.

Referring now to the drawing wherein like reference numerals denote like elements throughout the several views, FIG. 1 illustrates a cyclone separator 10, as known in the prior art, with the present invention installed therein. As previously discussed in the BACKGROUND OF THE INVENTION, the typical cyclone separator employs a separation chamber 12 which is defined by a cylindrical wall 14. An inlet 16, having height and width dimensions, intersects the cylindrical wall 14 of the separation chamber 12 tangentially to afford introduction of a fluid, having particulate materials entrained therein, into the separation chamber 12.

The cyclone separator 10 illustrated in the figures is one wherein an inside tangent inlet 16 is employed. That is, fluid inserted tangentially in the separation chamber 12 immediately merges completely with circumferential flow within the chamber 12.

As seen in FIG. 1, the height dimension of the inlet 16 is, typically, greater than the width dimension. The height dimension is frequently able to be measured as a distance from an upper wall 18 of the separation chamber 12, the upper wall 20 of the inlet 16 usually being flush with the upper wall 18 of the separation chamber 12.

Figure 2:
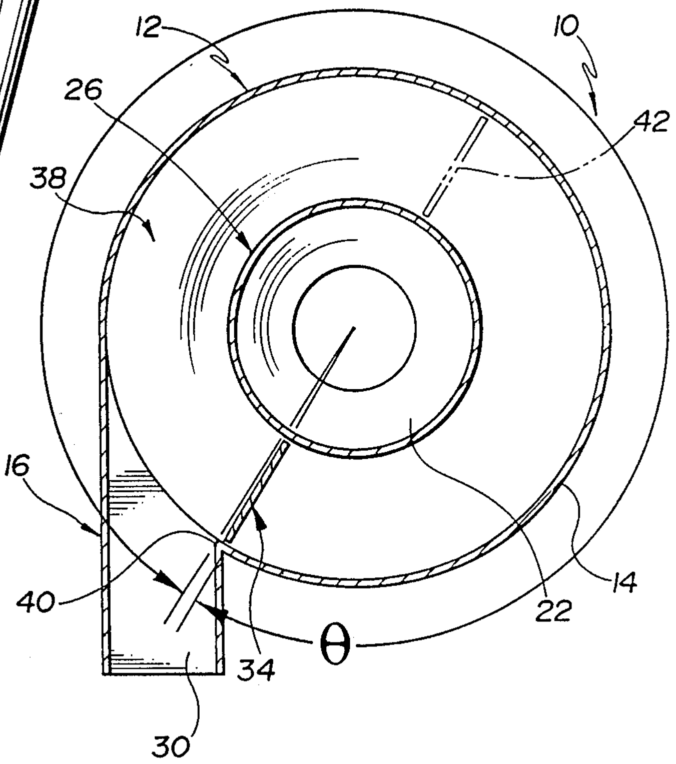
FIG. 2 is a top plan sectional view taken generally along line 2—2 of FIG. 1.

FIGS. 1 and 2 also illustrate a generally conical collection chamber 22. The collection chamber 22 is disposed at a lower end 24 of the separation chamber 12 and communicates therewith, the collection chamber 22 having a widest diameter substantially the same as the diameter of the separation chamber 12.

The conical collection chamber 22 is shown as truncated at the bottom end thereof. A discharge orifice (not shown) can, thereby, be provided.

It will be understood that the discharge is sealed with respect to ambient air in the space in which the separator 10 operates. Typically, a rotary valve is employed for moving particulate matter passing down the inside wall of the cone 22 through the discharge orifice, prior to the material being conveyed away from the separator 10. Such a rotary valve is not illustrated and is not part of the present invention.

Also as previously discussed, a cyclone separator employs a gas egress conduit or vortex finder 26 which extends from the upper closure wall 18 of the separation chamber 12 and centrally into that chamber 12. A lower lip 28 of the vortex finder 26 is typically positioned at a height below the lower wall 30 of the inlet 16. By so configuring the vortex finder 26 relative to the inlet 16, particulate matter entrained in gas passing through the inlet 16 into the separation chamber 12 will be "baffled" so as to preclude it from immediately passing out with fluid having been purified of the particulate.

FIG. 1 shows an upper end 32 of the vortex finder 26 as extending at some distance above the upper closure wall 18 of the separation chamber 12. It will be understood that the upper end 32 of the vortex finder 26 can be for venting, for example, air, after it has been purified, immediately back into the space in which the separator 10 is positioned. Alternatively, conduit means (not shown) could be mated with the upper end 32 of the vortex finder 26 for conducting the purified fluid to any desired location. Frequently, "ell's" (not shown) are employed for redirecting the direction of flow of the purified fluid.

Structure defined to this point is known in the prior art. Such description has been necessary, however, in order that the present invention be understood in its structural interrelationship and intended function.

As seen in the figures, the invention includes a baffle 34 which is interposed in circumferential flow of the gas during its first pass around the cylindrical wall 14 of the separation chamber 12. It is envisioned that the baffle 34 would be inserted through the top closure wall 18 of the separation chamber 12, although such a method of interposition is not exclusive.

As seen in FIG. 1, a slot 36 is provided in the upper closure wall 18, the slot 36 having dimensions similar to the cross sectional dimensions of the baffle 34. The slot 36 extends substantially across that portion of the top wall 18 overlying an annular space 38 defined within the separation chamber 12 between the cylindrical wall 14 thereof and the vortex finder 26. Consequently, when the baffle 34 is extended down into the annular space 38, it extends substantially across the space 38 so that, in the embodiment illustrated, substantially all the flow will be diverted downwardly beneath the baffle 34 rather than be allowed to divert radially inwardly or outwardly and pass laterally with respect to the baffle 34. It will be understood, however, that such a configuration, while presently understood to be the preferred embodiment, is not exclusive. It might be subsequently determined, as testing proceeds, that a narrower baffle 34 might even more efficiently function to minimize pressure drop and maximize particulate collection.

As seen in FIG. 1, the baffle 34 of the embodiment illustrated therein is oriented so that a plane defined thereby is one in which the axis of the cylindrical wall 14 of the separation chamber 12 would lie. That is, the plane defined by the baffle 34 is such that the flow approaches the baffle 34 generally perpendicular thereto.

It is anticipated that the baffle 34 would be able to be adjusted vertically. "X" illustrates a dimension of a portion of the baffle 34 extending downwardly from the upper closure wall 18 of the separation chamber 12. Since, in this embodiment, the upper wall 20 of the inlet 16 is flush with the upper closure wall 18 of the separation chamber 12, X also represents (and is intended to do so) the measure of radial coextensivity between the baffle 34 and the inlet 16. That is, X represents the portion of the height dimension of the inlet 16 which is radially coextensive with some portion of the baffle 34.

Angular placement of the baffle 34, it appears from testing, significantly contributes to the effectiveness thereof. The angle $\theta$ represents the angle at which the baffle 34 is positioned, in a direction of circumferential fluid flow within the cylindrical wall 14 of the separation chamber 12, with respect to a point 40 on the cylindrical wall 14 at which fluid flow first enters the separation chamber 12 through the inlet 16. This point 40 is defined as the "0°" position.

It is believed, in view of testing conducted to date, that a $\theta$ of approximately 359° is optimum. By so angularly positioning the baffle 34, fluid flow immediately entering the separation chamber 12 is unobstructed, and turbulence is, thereby, minimized. Rotational velocity is not, however, immediately impeded, and, consequently, particulate centrifugal separation is still maintained at a high level.

Both FIGS. 1 and 2 illustrate a baffle 34 as being positioned at $\theta$ of approximately 359°. Those figures, additionally, illustrate, in phantom, as at 42, a $\theta$ position of approximately 180°. While it is felt that a $\theta$ of approximately 359° would be optimum, testing has revealed that a position anywhere in a range between 180° and approximately 359° is probably acceptable.

A baffle 34 thusly described has been found efficient for both decreasing pressure drop between the inlet 16 and the outlet 32, of the separator 10 and maximizing particulate separation. The decrease in pressure drop occurs for a number of reasons. First, while rotational rate of flow about the cylindrical wall 14 of the separation chamber 12 is not immediately decreased because of the $\theta$ positioning of the baffle 34, the baffle 34 does eventually function to decrease rotational rate. While particulate materials have been centrifugally removed during the first pass of the flow around the chamber 12, when the flow eventually is confronted by the baffle 34, the rotational rate will be diminished. This decrease in rotational rate functions to decrease the pressure drop.

Additionally, while it was initially thought that a baffle 34 generally normal to the direction of flow might increase turbulence, tests have confirmed that, while the flow is redirected somewhat downwardly, turbulence is, in fact, decreased. In these tests, it was observed that air was stagnant at the upper end of the baffle and forced oncoming air and dust to spiral downward smoothly below the baffle, partly or wholly avoiding turbulent confluence with inlet air. Again, pressure drop, being a function of turbulence, is decreased.

Calculations by Shepherd and Lapple have illustrated that pressure drop through a particular cyclone separator is a function of a number of factors. These include the height and width dimensions of the inlet 16, the diameter of the vortex finder 26, etc.

A constant for the particular cyclone separator must be applied to the equation to determine the pressure drop that will result during the operation of the separator 10. The constant is a function of the geometry of the device. Pressure drop is directly proportional to the constant. Employment of the present invention in a cyclone separator has been found to adjust that constant downwardly. In fact, the adjustment can be quite drastic.

Tests have been conducted utilizing a separator having an inlet 16 with a height of 4 inches and a width of $2\frac{3}{8}$ inches, and a vortex finder 26 having a diameter of $4\frac{3}{4}$ inches. With a separator 10 so constructed, it was found to have a constant, without insertion of any baffle 34, of 1.11. By inserting a baffle 34 at a $\theta$ angle of 270°, and an X of one inch, the constant would be reduced to 0.77. This is a reduction of in excess of thirty percent.

By increasing X, however, even better results were obtained. By increasing X to 2 inches, the constant was decreased to 0.51. By increasing X to 3 inches, the constant was decreased to 0.37. By increasing X to 4 inches, the constant was decreased to 0.25. Finally, when the baffle 34 was inserted so that it extended 1 inch below the bottom of the inlet 16, the constant was decreased to 0.19. This is a decrease of in excess of 80%. Since the constant is directly proportional to the pressure drop realized, in excess of 80% of pressure drop can be eliminated by utilizing a baffle 34 in the manner described.

Employment of the baffle 34, further, effects maintenance of a high degree of particulate separation. By deflecting circumferential flow downwardly from the inlet 16, less turbulence is permitted at the entrance to the separation chamber 12. Consequently, the centrifugal effect upon the particulate matter will be increased and better separation will be realized.

Additionally, as previously discussed, in cyclone separators a column of particulate matter at the bottom of the collection chamber 22 can tend to be caught up in the vortex of particle-purged gas and be drawn upwardly through the vortex finder 26, thereby defeating, to some extent, the effect of the separator 10. When a separator 10 is provided with a baffle 34 in accordance with the present invention, any rising dust vortex has been found to be deflected in a radial direction sufficiently so that it will not be passed upwardly through the vortex finder 26. Such rising particulate matter will, again be centrifugally separated to pass downwardly into the collection chamber 22.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. In a particulate matter separator including a centrifugal separation chamber having a generally cylindrical side wall and an upper wall, a particulate matter collection chamber at a bottom axial end of the separation chamber, an inlet, spaced axially upward from the collection chamber proximate the upper wall, through which a gas flow is introduced into the separation chamber tangentially for spiral flow therewithin, and an axially extending gas egress conduit, having a bottom end open to the interior of the separation chamber, extending generally centrally into the separation chamber from an upper axial end thereof to define a generally annular space between the side wall of the separation chamber and the gas egress conduit; the improvement comprising means for variably minimizing turbulence in said centrifugal separation chamber including a baffle extending from the upper wall into the generally annular space between the side wall of the separation chamber and the gas egress conduit, said baffle being at least partially radially coextensive with the gas flow inlet.

2. The apparatus of claim 1 wherein said baffle has a radial dimension wherein it extends completely across the generally annular space.

3. The apparatus of claim 1 wherein said baffle defines a plane in which the axis of the separation chamber side wall lies.

4. The apparatus of claim 1 wherein said baffle is adjustable in an axial direction so that the degree to which said baffle is radially coextensive with the gas flow inlet can be varied.

5. The apparatus of claim 1 wherein a circumferential position on the side wall of the separation chamber at which gas flow first enters the separation chamber is defined as a "0°" position, and wherein said baffle is angularly spaced, in a direction in which gas having entered the separation chamber circumferentially flows, at between 180° and 359° from said "0°" position.

6. The apparatus of claim 5 wherein said baffle is angularly spaced, in a direction in which gas having entered the separation chamber circumferentially flows, at between 270° and 359° from said "0°" position.

* * * * *